US011625583B2

(12) United States Patent
Dumoulin et al.

(10) Patent No.: US 11,625,583 B2
(45) Date of Patent: *Apr. 11, 2023

(54) QUALITY MONITORING AND HIDDEN QUANTIZATION IN ARTIFICIAL NEURAL NETWORK COMPUTATIONS

(71) Applicant: Mipsology SAS, Palaiseau (FR)

(72) Inventors: Frederic Dumoulin, Magny-les-hameaux (FR); Ludovic Larzul, El Dorado Hills, CA (US)

(73) Assignee: MIPSOLOGY SAS, Palaiseau (FR)

(*) Notice: Subject to any disclaimer, the term of this patent is extended or adjusted under 35 U.S.C. 154(b) by 629 days.

This patent is subject to a terminal disclaimer.

(21) Appl. No.: 16/274,426

(22) Filed: Feb. 13, 2019

(65) Prior Publication Data

US 2020/0257966 A1      Aug. 13, 2020

(51) Int. Cl.
*G06N 3/063* (2023.01)
*G06N 3/082* (2023.01)
*G06F 11/34* (2006.01)
*G06N 3/08* (2023.01)

(52) U.S. Cl.
CPC ......... *G06N 3/063* (2013.01); *G06F 11/3466* (2013.01); *G06N 3/08* (2013.01); *G06N 3/082* (2013.01)

(58) Field of Classification Search
CPC ..... G06N 3/063; G06N 3/082; G06F 11/3466
See application file for complete search history.

(56) References Cited

U.S. PATENT DOCUMENTS

| 5,633,989 A * | 5/1997 | Shin | G06N 3/0635 706/35 |
| 6,539,368 B1 * | 3/2003 | Chernikov | G06N 3/048 706/41 |
| 6,611,771 B1 * | 8/2003 | Habetler | G01R 31/346 702/58 |
| 6,973,034 B1 * | 12/2005 | Natarajan | H04L 41/0816 370/235 |

(Continued)

OTHER PUBLICATIONS

Park et al. (Weighted-Entropy-based Quantization for Deep Neural Networks, Jul. 2017, pp. 5456-5464) (Year: 2017).*

(Continued)

*Primary Examiner* — George Giroux
(74) *Attorney, Agent, or Firm* — Georgiy L. Khayet

(57) ABSTRACT

Systems and methods for quality monitoring and hidden quantization in artificial neural network (ANN) computations are provided. An example method may include receiving a description of an ANN and input data associated with the ANN, performing, based on a quantization scheme, quantization of the ANN to obtain a quantized ANN, performing, based on the set of input data, ANN computations of the quantized ANN to obtain a result of the ANN computation for the input data, while performing the ANN computations, monitoring, a measure of quality of the ANN computations of the quantized ANN, determining that the measure of quality does not satisfy quality requirements, and in response to the determination, informing a user of an external system of the measure of quality, and adjusting, based on the measure of quality, the quantization scheme to be used in the ANN computations for further input data.

23 Claims, 9 Drawing Sheets

(56) References Cited

U.S. PATENT DOCUMENTS

| | | | | |
|---|---|---|---|---|
| 2015/0088796 | A1* | 3/2015 | Julian | G06N 3/0454 |
| | | | | 706/26 |
| 2016/0328646 | A1 | 11/2016 | Lin et al. | |
| 2017/0243111 | A1* | 8/2017 | Iyer | G06N 3/084 |
| 2017/0308789 | A1* | 10/2017 | Langford | G06N 7/005 |
| 2018/0232663 | A1* | 8/2018 | Ross | G06N 3/105 |
| 2018/0240041 | A1* | 8/2018 | Koch | G06N 20/10 |
| 2018/0276529 | A1* | 9/2018 | Paul | G06N 3/0454 |
| 2018/0341857 | A1* | 11/2018 | Lee | G06N 3/08 |
| 2019/0180177 | A1* | 6/2019 | Yim | G06N 3/0481 |
| 2020/0202214 | A1* | 6/2020 | Peranandam | G06K 9/6273 |
| 2020/0241954 | A1* | 7/2020 | Venkataramani | G06N 3/04 |

OTHER PUBLICATIONS

Rakitianskaia et al. (Measuring Saturation in Neural Networks, Dec. 2015, pp. 1423-2430) (Year: 2015).*

Ahmad Shawahna et al: "FPGA-based Accelerators of Deep Learning Networks for Learning and Classification: A Review", arxiv.org, Cornell University Library, 201 Olin Library Cornell University Ithaca, NY 14853, Jan. 1, 2019 (Jan. 1, 2019), XP081010484, DOI: 10.1109/ACCESS.2018.2890150, the whole document.

Darryl D Lin et al: "Fixed Point Quantization of Deep Convolutional Networks", Nov. 19, 2015 (Nov. 19, 2015), pp. 1-10, XP055284812, Retrieved from the Internet: URL: https:jjarxiv. orgfpdf/1511.06393v3.pdf [retrieved on Jun. 30, 2016], p. 1-8.

Djalaei Babak et al: "Optimizing embedded neural networks based on saturated states", 2018 Real-Time and Embedded Systems and Technologies (RTEST), IEEE, May 9, 2018 (May 9, 2018), pp. 24-30, XP033366968, DOI: 10.1109/RTEST.2018.8397075, p. 24-29, right-hand column, last paragraph.

Ian Taras et al: "Quantization Error as a Metric for Dynamic Precision Scaling in Neural Net Training", arxiv.org, Cornell University Library, 201, Olin Library Cornell University Ithaca, NY 14853, Jan. 25, 2018 (Jan. 25, 2018), XP081014281, p. 1-3.

* cited by examiner

QUALITY MONITORING AND HIDDEN QUANTIZATION IN ARTIFICIAL NEURAL NETWORK COMPUTATIONS

TECHNICAL FIELD

The present disclosure relates generally to data processing and, more particularly, to systems and methods for quality monitoring and hidden quantization for artificial neural network (ANN) computations.

BACKGROUND

Artificial Neural Networks (ANNs) are simplified and reduced models reproducing behavior of human brain. The human brain contains 10-20 billion neurons connected through synapses. Electrical and chemical messages are passed from neurons to neurons based on input information and their resistance to passing information. In the ANNs, a neuron can be represented by a node performing a simple operation of addition coupled with a saturation function. A synapse can be represented by a connection between two nodes. Each of the connections can be associated with an operation of a multiplication by a constant. The ANNs are particularly useful for solving problems that cannot be easily solved by classical computer programs.

While forms of the ANNs may vary, they all have the same basic elements similar to the human brain. A typical ANN can be organized into layers, each of the layers may include many neurons sharing similar functionality. The inputs of a layer may come from a previous layer, multiple previous layers, any other layers, or even the layer itself. Major architectures of ANNs include Convolutional Neural Network (CNN), Recurrent Neural Network (RNN) and Long Term Short Memory (LTSM) network, but other architectures of ANN can be developed for specific applications. While some operations have a natural sequence, for example a layer depending on previous layers, most of the operations can be carried out in parallel within the same layer. The ANNs can then be computed in parallel on many different computing elements similar to neurons of the brain. A single ANN may have hundreds of layers. Each of the layers can involve millions of connections. Thus, a single ANN may potentially require billions of simple operations like multiplications and additions.

Because of the larger number of operations and their parallel nature, ANNs can result in a very heavy load for processing units (e.g., CPU), including those running at high rates. Sometimes, to overcome limitations of CPUs, graphics processing units (GPUs) can be used to process large ANNs because GPUs have a much higher throughput capacity of operations in comparison to CPUs. Because this approach solves, at least partially, the throughput limitation problem, GPUs appear to be more efficient in the computations of ANNs than the CPUs. However, GPUs are not well suited to the computations of ANNs because the GPUs have been specifically designed to compute graphical images.

The GPUs may provide a certain level of parallelism in computations. However, the GPUs are constraining the computations in long pipes, which results in latency and lack of reactivity. To deliver the maximum throughput, very large GPUs can be used, which may involve excessive power consumption, which is a typical issue of GPUs. Since the GPUs may require more power consumption for the computations of ANNs, the deployment of GPUs can be difficult.

To summarize, CPUs provide a very generic engine that can execute very few sequences of instructions with a minimum effort in terms of programming, but lack the power of computing required for ANNs. GPUs are slightly more parallel and require a larger effort of programming than CPUs, which can be hidden behind libraries with some performance costs but are not very well suitable for ANNs.

Field Programmable Gate Arrays (FPGAs) are professional components that can be programmed at the hardware level after they are manufactured. The FPGAs can be configured to perform computations in parallel. Therefore, FPGAs can be well suited to compute ANNs. Programming of FPGAs, however, is challenging, requiring a much larger effort than programming CPUs and GPUs. Thus, adaption of FPGAs to perform ANN computations can be more challenging than adapting CPUs and GPUs.

Most attempts in programming FPGAs to compute ANNs have been focusing on a specific ANN or a subset of ANNs; required to modify the ANN structure to fit into a specific limited accelerator; or provided a basic functionality without solving the problem of computing ANN on FPGAs globally. The computation scale is typically not taken into account by existing FPGA solutions, with much of the research being limited to a single or few computation engines, which could be replicated. Furthermore, the existing FPGA solutions do not solve the problem of massive data movement required at a large scale for the actual ANN involved in real industrial applications.

The inputs computed with an ANN are typically provided by an artificial intelligence (AI) framework. Those programs are used by the AI community to develop new ANN or global solutions based on ANN. However, FPGAs typically lack integration with AI frameworks.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are computer-implemented systems and methods for quality monitoring and hidden quantization in ANN computations. Embodiments of the present disclosure may facilitate determination of quantization intervals in batch ANN computations.

According to one example embodiment, a system for quality monitoring and hidden quantization in artificial neural network (ANN) computations is provided. The system may include one or more processing units configured to receive a description of an ANN and input data associated with the ANN. The processing units can be further configured to perform, for the input data, ANN computations of the ANN to obtain a result of the ANN computations for the input data. While performing the ANN computations, the processing units can monitor a measure of quality of the ANN computations.

Performing ANN computations may include performing, based on a quantization scheme, quantization of the ANN to obtain a quantized ANN and performing, based on the input data, ANN computations of the quantized ANN to obtain the result of the ANN computations for the input data.

The processing units can determine that the measure of quality does not satisfy quality requirements. In response to such determination, the processing units can adjust, based on the measure of quality, the quantization scheme to be used in the ANN computations for further input data. The processing units can be configured to receive a user input including the quality requirement.

The quantization of the ANN may include mapping data from a first interval of a first data type into data from a second interval of a second data type. The adjustment of the quantization scheme may include modifying at least one boundary of the first interval or the second interval. The adjustment of the quantization scheme results in improving the measure of quality.

The monitoring of the measure of quality may include counting the number of neuron saturations. A neuron of the ANN is said to be saturated when a result of the computation of the neuron is substantially close to one of the boundaries of the second interval.

The processing units may determine that the measure of quality satisfies quality requirements. In response to the determination, the processing units may return the results of the ANN computations of the quantized ANN for the input data and keep the quantization scheme to be later used for the further input data.

The processing units can be configured to repeat performing, based on the adjusted quantization scheme, quantization of the ANN to obtain a further quantized ANN, performing ANN computations of the further quantized ANN for the input data, monitoring a further measure quality of the ANN computations of the further quantized ANN, determining that the further measure of quality does not satisfy quality requirements, and in response to the determination that the further measure of quality does not satisfy the quality requirements, adjusting the further quantization scheme to be used for the further input data.

The processing units may determine that the further measure of quality satisfies the quality requirements. In response to the determination that the further measure of quality satisfies the quality requirements, the processing units may keep the further quantization scheme to be used for the ANN computations for the further input data.

The processing units can be configured to determine that the further measure of quality satisfies the quality requirements. In response to the determination that the further measure of quality satisfies the quality requirements, the processing units may return the result of the ANN computation of the further quantized ANN for the input data.

The processing units can be configured to receive a further input data. The processing unit may perform ANN computations of the quantized ANN for the further input data while keeping the quantized ANN unchanged. The processing units may determine, based on the ANN computations for the further input data, a further measure of the quality. The processing units may adjust, based on the further measure of quality, the quantization scheme and perform quantization of the ANN based on the adjusted quantization scheme.

The system may include a storage unit configured to store some of the input data and an information concerning the quantization of the ANN. The processing units can be configured to perform the ANN computations of the further quantized ANN for the stored input data after the quantization scheme has been adjusted.

The ANN computations of the quantized ANN can be performed on an integrated circuit. The integrated circuit can be configured to collect information concerning quality of the ANN computations.

The processing units can be configured to receive the description of the ANN and the input data associated with the ANN from an external system. The processing units, based on a measure of quality, may sent a message concerning the measure of quality to the external system or a user of the external system. The external system can, in response to receiving the message, send an instruction to the processing system. The instruction may cause the processing units to perform one or more operations concerning ANN computations.

According to another example embodiment, a method for monitoring quality of a result of computations of ANN computations is provided. The method may include receiving, by one or more processing units, from an external system, a description of an ANN and input data associated with the ANN. The method may perform, by the processing units and based on the set of input data, ANN computations of the ANN to obtain result of the ANN computation for the input data. While performing the ANN computations, the method may further perform monitoring, by the processing units, a measure of quality of the ANN computations of the ANN.

Performing computations of the ANN may include performing, based on a quantization scheme, quantization of the ANN and performing, based on the input data, computations of the quantized ANN. The method may further determine that the measure of quality does not satisfy quality requirements. In response to the determination, the method may adjust, by the processing units and based on the measure of quality, the quantization scheme to be used in the ANN computations for further input data.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements and, in which.

DETAILED DESCRIPTION

Figure 1:
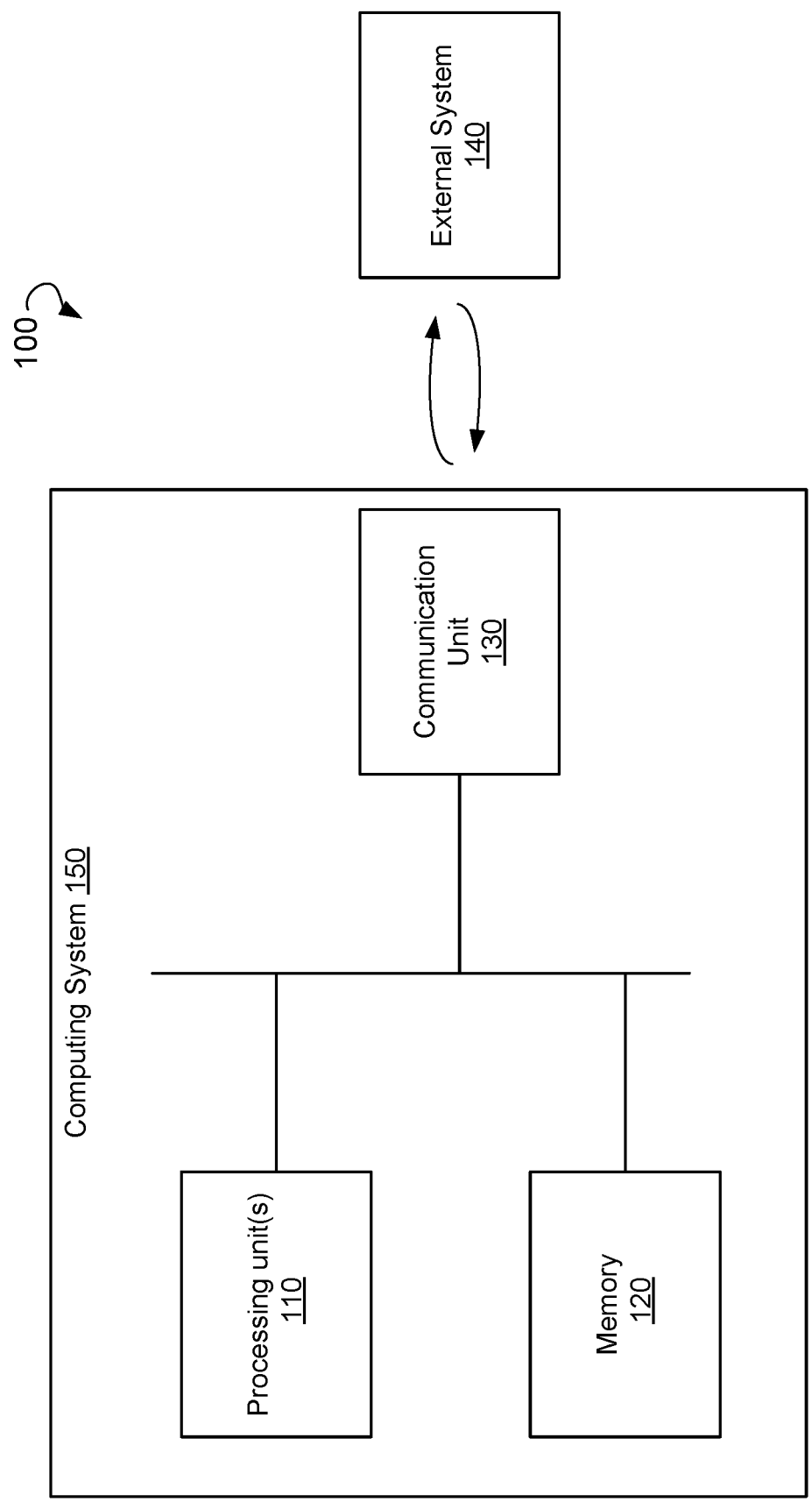
FIG. 1 is a block diagram showing an example system for quality monitoring and hidden quantization in ANN computations, according to some example embodiments

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

For purposes of this document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

Embodiments of this disclosure are directed to methods and systems for quality monitoring and hidden quantization in ANN computations. Embodiments of the present disclosure may facilitate adjustment of quantization intervals for input values, weights, and other parameters in ANN while performing batch ANN inference computation.

While some embodiments of the present disclosure are described herein in reference to operations of FPGAs, the present technology may be also practiced with application-specific integrated circuits (ASICs), programmable logic devices, transistor-based circuits, or various combinations thereof. The methods described herein can be also implemented by hardware modules, software modules, or combinations of both. The methods can also be embodied in computer-readable instructions stored on computer-readable media.

The term "module" shall be construed to mean a hardware device, software, or a combination of both. For example, a hardware-based module can use one or more microprocessors, FPGAs, ASICs, programmable logic devices, transistor-based circuits, or various combinations thereof. Software-based modules can constitute computer programs, computer program procedures, computer program functions, and the like. In addition, a module of a system can be implemented by a computer or server, or by multiple computers or servers interconnected into a network. Alternatively, a module may also refer to a subpart of a computer system, a hardware device, an integrated circuit, or a computer program.

Technical effects of certain embodiments of the present disclosure can include increasing accuracy of ANN computations. Further technical effects of certain embodiments of the present disclosure can allow decreasing saturations of neurons in ANN computations.

Referring now to the drawings, exemplary embodiments are described. The drawings are schematic illustrations of idealized example embodiments. Thus, the example embodiments discussed herein should not be construed as limited to the particular illustrations presented herein, rather these example embodiments can include deviations and differ from the illustrations presented herein.

FIG. 1 is a block diagram showing an example environment 100, wherein methods for quality monitoring and hidden quantization of ANNs can be implemented, according to some example embodiments. The environment 100 may include a computing system 150 and an external system 140. The external system 140 may include a further computer system operable to communicate with the computing system 150.

The computing system 150 can be a part of a computing system, such as a personal computer, a server, a cloud-based computing recourse, and the like. The computing system 150 may include one or more processing units 110, a memory 120, and a communication unit 130. The memory 120 may include computer-readable instructions for execution by the processing unit(s) 110. The processing unit(s) 110 may include a programmable processor, such as a microcontroller, central processing unit (CPU), and so forth. In other embodiments, the processing unit(s) 110 may include an application-specific integrated circuit(s) or programmable logic array(s), such as an FPGA(s), designed to implement functions performed by the system 150, for example performing ANN computations and hidden quantization in the ANN computations. In various embodiments, the computing system 150 may be installed on a remote server or provided as a cloud service residing in a cloud storage.

The processing unit(s) 110 may be configured to receive, from the external system 140 and via the communication unit 130, a description of an ANN and input data associated with the ANN. The processing unit(s) 110 may perform, based on a quantization scheme, quantization of the ANN to obtain a quantized ANN. The processing unit(s) 110 may perform, based on the set of input data, ANN computations of the quantized ANN to obtain results of the ANN computations for the input data. While performing the ANN computations, the processing unit(s) 110 may monitor a measure of quality of the ANN computations of the quantized ANN. The processing unit(s) 110 may determine that the measure of quality does not satisfy quality requirements. In response to the determination, the processing unit(s) 110 may adjust, based on the measure of quality, the quantization scheme to be used in the ANN computations for further input data. The processing unit(s) 110 may send results of the ANN computations to the external system 140. The processing unit(s) 110 may send a message concerning quality of the ANN computations to the external system 140 or a user. Upon receiving the message concerning the quality of the ANN computations, the extremal system 140 or the user may send, to the processing units 110, one or more instructions. The instructions may be executable by the processing units to cause the processing unit to adjust ANN computations.

In some embodiments of the present disclosure, the quantization may include converting data associated with ANN from a first data type to a second data type. The data presented by the second data type may require less memory to be stored than the same data presented by the first data type. Operations performed on the data converted to the second data type may require less computational resources than the same operations on the data in the first data type.

While, for simplicity, some embodiments of the present disclosure deal with real numbers as the first data type and integers as the second data type, similar methods can be used for mapping and quantization of data using other pairs of data types. For example, the first data type may include floating point real numbers and the second data type may include fixed-point real numbers. In another example, the first data type can include double precision floating point numbers and the second data type may include single precision floating-point numbers. In another example, the first data type may include 32-bit floating point numbers and the second data type may include 8-bit integers. In yet another example, the first data type may include 8-bit integers and the second data type may include 4-bit integers.

Figure 2:
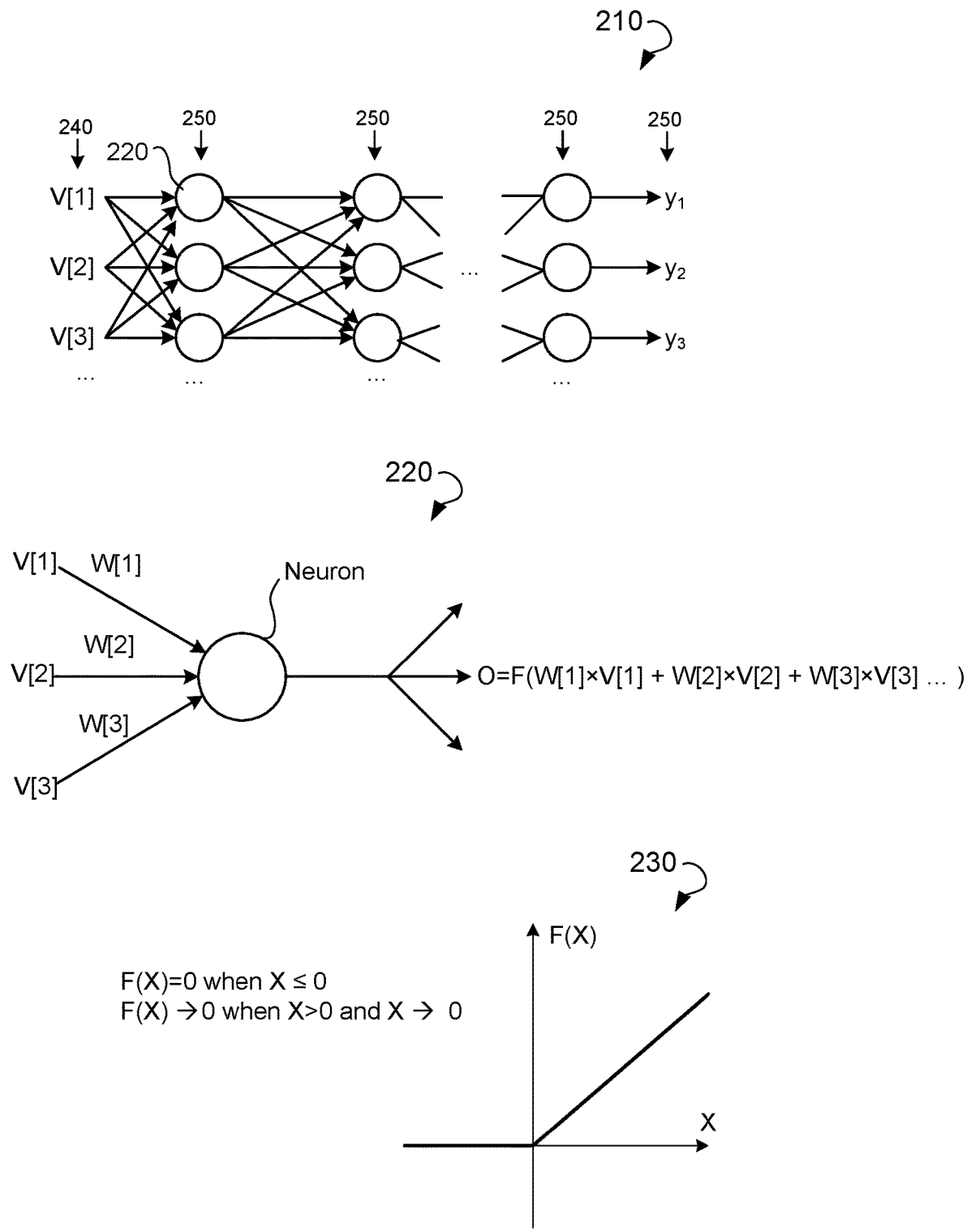
FIG. 2 shows an ANN, neuron, and transfer function, according to an example embodiment.

FIG. 2 shows ANN 210, neuron 220, and transfer function 230, according to some example embodiments. The ANN 210 may include one or more input layers 240, one or more hidden layers 250, and one or more output layers 250. Each of the input layers 240, hidden layers 250, and output layers 260 may include one or more (artificial) neurons 220. The number of neurons can be different for different layers.

Each of neurons 220 may be represented by a calculation of a mathematical $$O = F\left(\sum_{i=1}^{n} V[i] \times W[i]\right) \quad (1)$$

wherein V[i] are neuron input values, W[i] are weights assigned to input values at the neuron, and F(X) is a transfer function. Typically, the transfer function 230 F(X) is selected to be zero for X<0 and have a limit of zero as X approaches zero. For example, the transfer function F(X) can be in the form of a sigmoid. The result of the calculation of a neuron propagates as an input value of further neurons in the ANN. The further neurons can belong to either the next layer, previous layer, or the same layer.

It should be noted that while the ANN 210 illustrated in FIG. 2 can be referred to as a feedforward neural network, embodiments of the present disclosure can be also used in computations of convolution neural networks, recurrent neural networks, long short-term memory networks, and other types of ANNs.

Figure 3A:
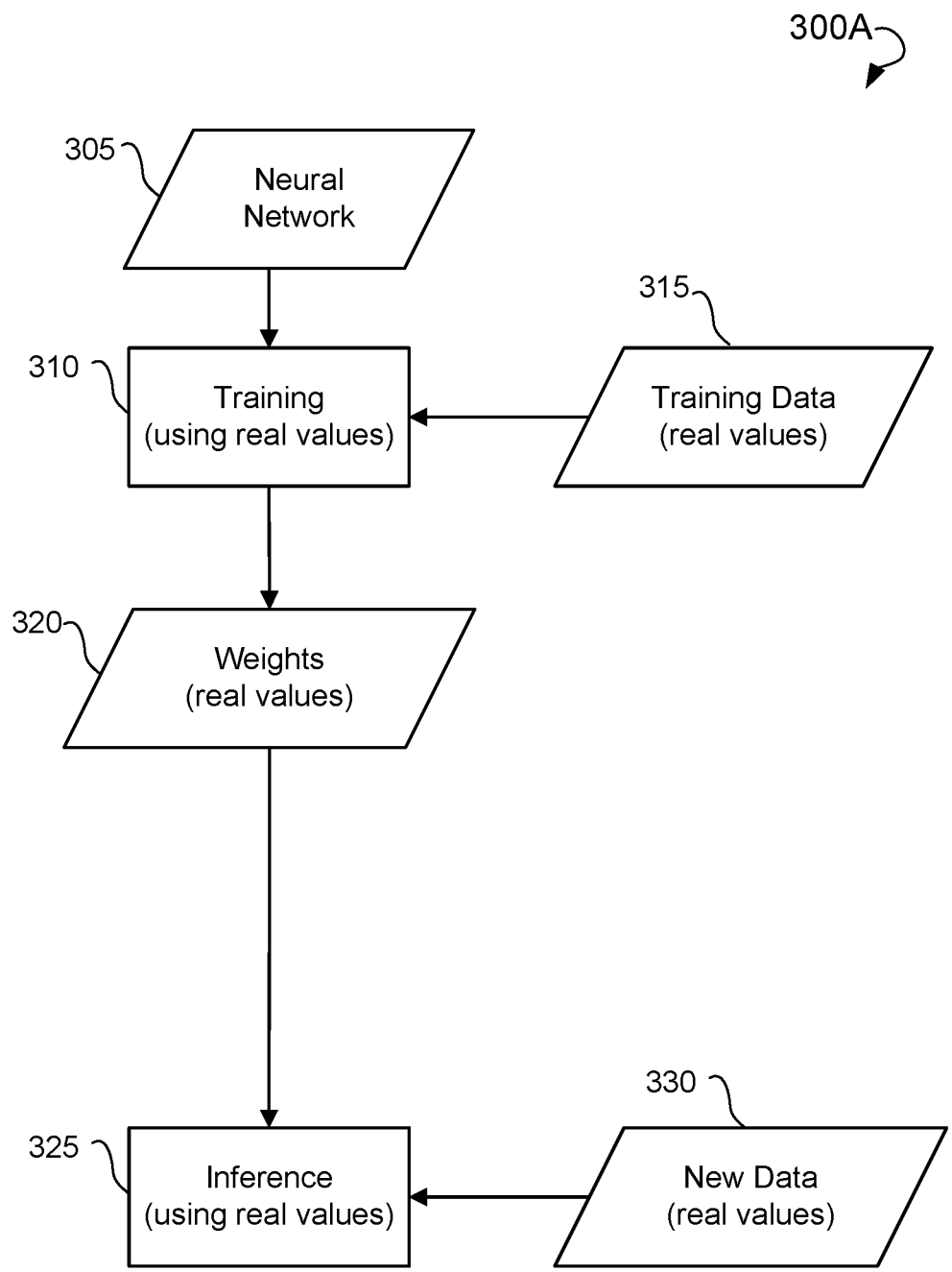
FIG. 3A is a flow chart showing training and inference of an ANN using the data type, according to some example embodiments.

FIG. 3A is a flow chart showing a workflow 300A for a training 310 and inference 325 of an ANN, according to some example embodiments. The training 310 (also known as learning) is a process of teaching ANN 305 to output a proper result based on a given set of training data 315. The process of training may include determining weights 320 of neurons of the ANN 305 based on training data 315. The training data 315 may include samples. Each sample may be represented as a pair of input values and expected output. The training data 315 may include hundreds to millions of samples. While training 310 is required to be performed only once, it may require a significant amount of computations and take a considerable time.

The ANNs can be configured to solve different tasks including, for example, image recognition, speech recognition, handwriting recognition, machine translation, social network filtering, video games, medical diagnosis, and so forth.

The inference 325 is a process of computation of an ANN. The inference 325 uses trained ANN weights 320 and new data 330 including new sets of input values. For each new set of input values, the computation of the ANN provides a new output that answers the problem that the ANN is supposed to solve. For example, an ANN can be trained to recognize various animals in images. Correspondingly, the ANN can be trained using millions of images of animals. Submitting a new image to the ANN would provide the information for animals in the new image (this process is known as image tagging). While the inference for each image takes fewer computations than training, the number of inferences can be large because new images can be received from billions of sources.

The inference 325 includes multiple computations of a sum of the following products:

$$\sum_{i=1}^{n} V[i] \times W[i] \quad (2)$$

wherein the V[i] are new input values and W[i] are weights associated with neurons of the ANN.

It should be noted that both training 310 and inference 325 in FIG. 3A are performed using computations based on the same type of data, for example, real values in floating-point format. Performing inference for a large number of input datasets of new data 330 using floating-point calculations can be time-consuming and may require significant computing resources for computations of the ANN. In some embodiments, the inference of the ANN can be performed using integer-based or fixed-point calculations in order to reduce computation time and computing resources required to perform ANN computations. To perform integer-based inference, real (floating point) values of input data and weights associated with the ANN can be quantized. Generally, quantization can refer to a process of reducing a number of bits that represent a real value number. For example, quantization may include converting 32-bit floating point numbers into 8-bit integers. Quantization may significantly reduce bandwidth of ANN computations and memory storage required to store input data, weights, and intermediate results of layers of the ANN.

Figure 3B:
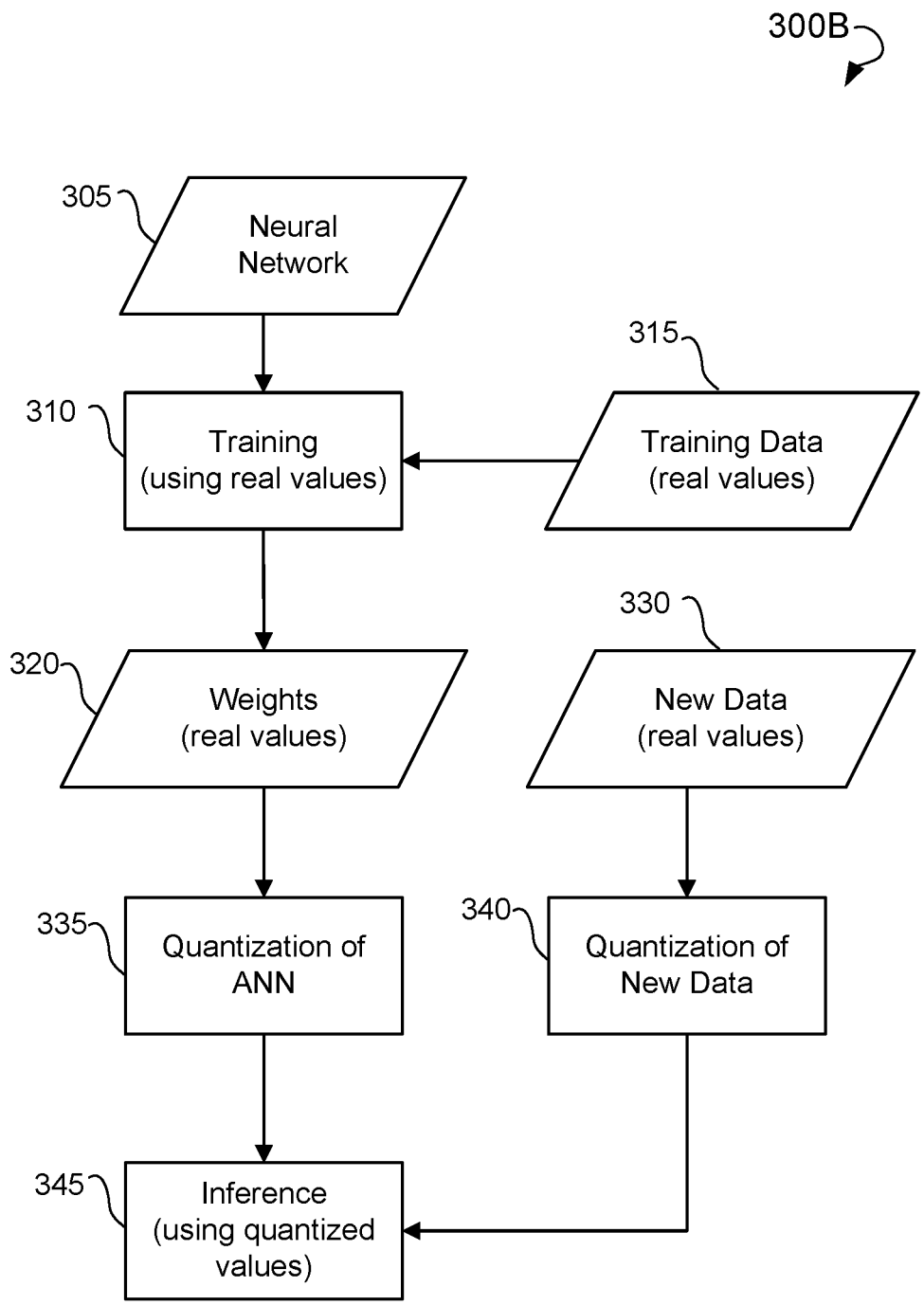
FIG. 3B is a flow chart showing training and inference of an ANN using different data type for training and inference, according to some example embodiments.

FIG. 3B is a flow chart showing a workflow 300B of training 310 and inference 345 of an ANN using different data types for training and inference, according to some example embodiments. The training 310 can be performed using training data 315. The training data 315 can be of a first data type, for example real values in floating-point format. The process of training may include determining weights 320 of neurons of the ANN 305. The weights 320 can be also of the first data type.

After determining the weights 320 in the first data type, the weights 320 and other parameters of ANN can be quantized in quantization 335. The weights 320 can be mapped to a set of a pre-determined number of values of a second data type. For example, the second data type may include integers. The inference 345 can be further performed using the quantized values for the weights 320. Prior to the inference 345, each input set in new data 330 can be also quantized, that is mapped to the values of the second data type, in quantization 340 using the same quantization scheme as in the quantization 335. Since the weights 320 and the input datasets of new data 340 are quantized and converted to the second data type, the inference 345 can be performed using hardware configured to perform computations using only second data type. The computations using the second data type may require less time and memory resources than the same computations using the first data type. However, the result of the inference 345 performed using the second data type can be less accurate than the result of inference 325 performed using the first data type used in the training of ANN.

Figure 4B:
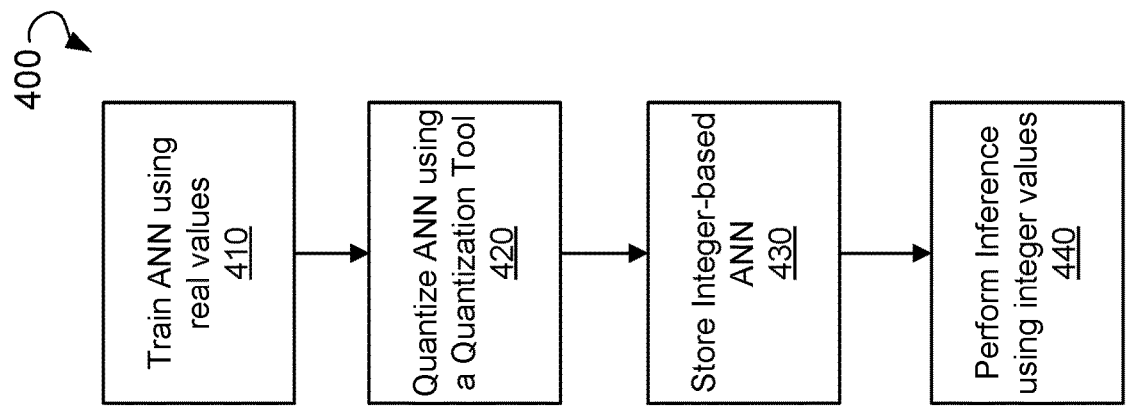
FIG. 4B is a flow chart showing steps of a method for managing quantization of ANN, according to an example embodiment.
Figure 4A:
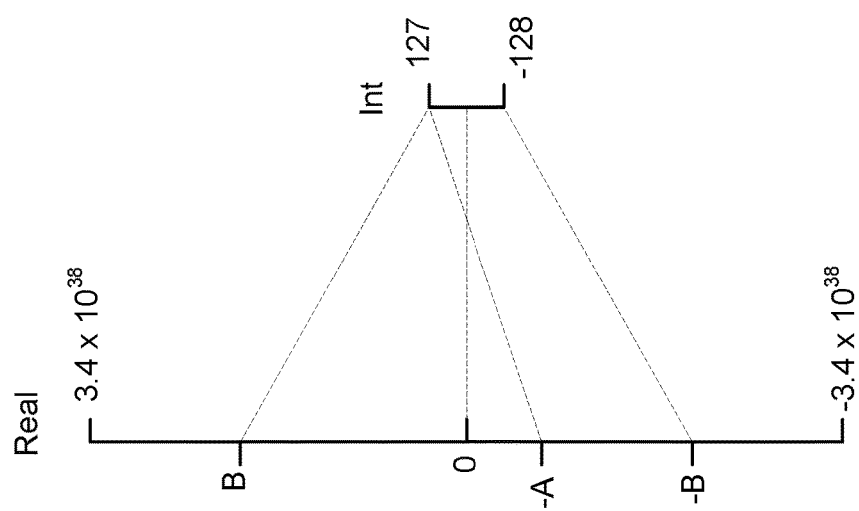
FIG. 4A is a schematic diagram showing an example quantization of data associated with ANN, according to some example embodiments.

FIG. 4A shows a simplified schematic of example quantization of data in ANN, according to some example embodiments. In FIG. 4A, the real value data associated with ANN, for example input values for a layer, are found within value range [−B, −A]. While in example of the FIG. 4A, the value range is shown to be located below zero, in general, the value range of input data can include interval with only positive values, both positive and negative input values, and zero value. The values within the value range can be divided into intervals $(t_i, t_{i+1}]$, i=1, ..., L, wherein L is a number of integers representing the input values. The intervals $(t_i, t_{i+1}]$ can be equal in length. The length of $(t_i, t_{i+1}]$ is referred as a quantization interval or a quantization step. All input data within the same interval $(t_i, t_{i+1}]$ can be mapped to an integer i. In example of FIG. 4A, the input data in interval [−B; −A] are real values 32-bit floating point data. The input data in [−B; −A] are represented by 8-bit integers between −128 to +127. Typically, a range to be quantized is selected to be symmetrical with respect to 0. In the example of FIG. 4A, the range [−B; +B] can be selected to include the input data from the range [−B; −A]. The accuracy of results of the inference ANN performed using integer values and integer-based operations depends on whether quantization intervals and quantization levels are selected accurately.

FIG. 4B is a block diagram showing a method 400 for quantization of ANN computations, according to some embodiments. The method 400 may correspond to some current approaches used for quantization of ANN computations. The method 400 can be implemented using the system 100 described above with reference to in FIG. 1.

The method 400 may include, in block 410, training an ANN using real values for input data, weights, and intermediate results of computations of layers of the ANN.

In block 420, the method 400 may quantize, using a quantization tool, the ANN to obtain an integer-based ANN. The quantization may include converting input values and weights of the neurons to integer values based on a range to be quantized, quantization intervals, and quantization levels assigned to the quantization intervals. The quantization intervals can be equal. The quantization levels can be equally spaced with the same quantization step. Quantization intervals can be determined per layer, since input data for the different layers can be of different ranges. The range of values to be quantized can be selected to be symmetrical with respect to zero as shown in FIG. 4A.

In block 430, the method 400 may include storing parameters of the integer-based ANN in a memory storage.

In block 440, the method may include performing inference for integer-based ANN for at least one set of input data. The inference of ANN can be performed using integer values for weights of neurons. Input data for each of the layers of ANN can be converted to integer values based on the quantization intervals determined for the layer.

Figure 5:
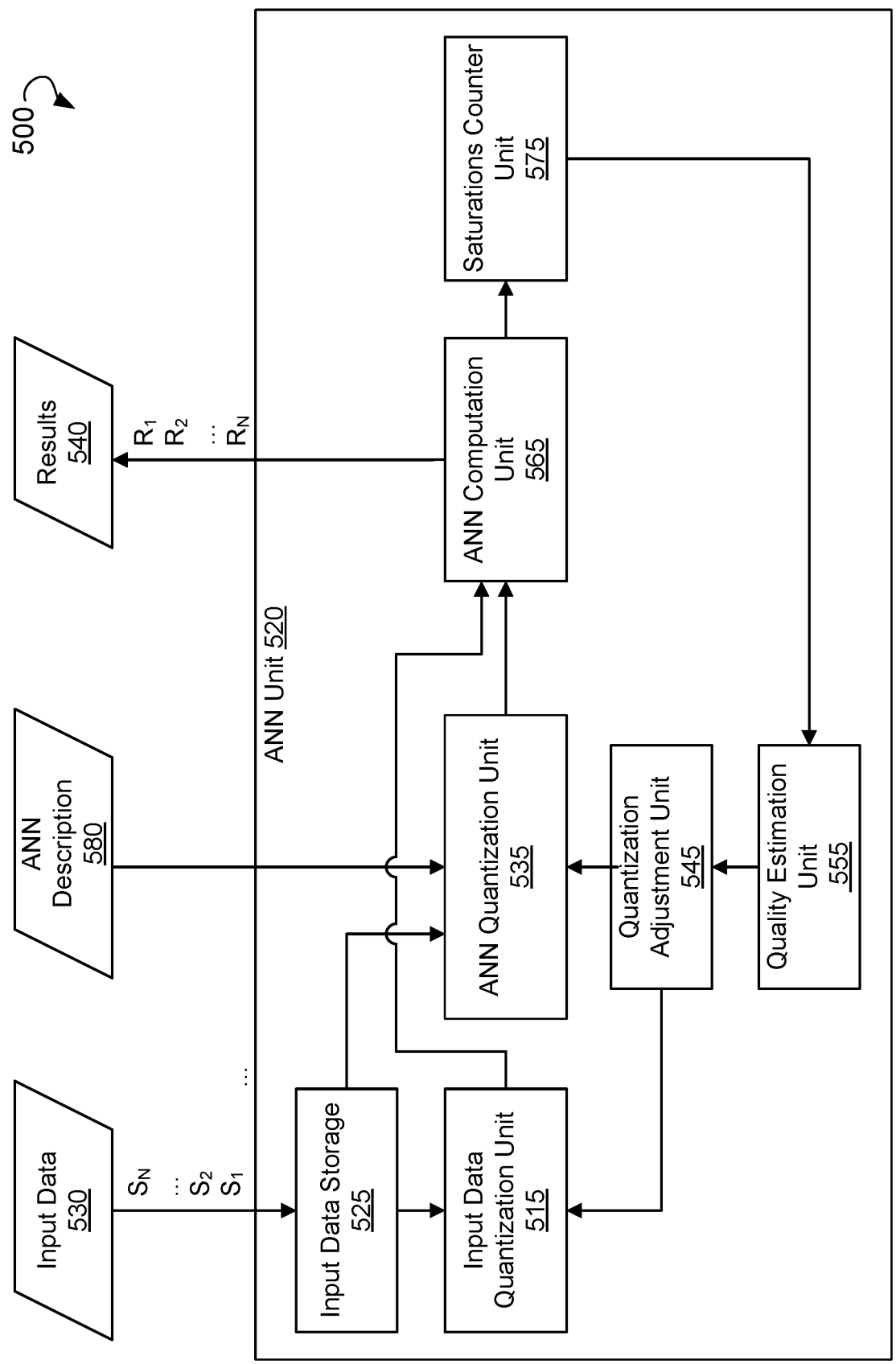
FIG. 5 is a system for quality monitoring and hidden quantization in ANN commutations, according to some example embodiments.

FIG. 5 is a block diagram showing a system 500 for quality monitoring and hidden quantization in ANN, according to some example embodiments of the present disclosure. The system 500 may include an ANN unit 520. The ANN unit may include an input data storage 525, an input data quantization unit 515, an ANN quantization unit 535, an ANN computations unit 565, saturations counter unit 575, a quantization adjustment unit 545, and a quality estimation unit 555. The units 515, 525, 545, 555, 565, and 575 can be software-based implemented units or hardware-based implemented units. For example, the ANN computation unit 565 may include one or more microprocessors, FPGAs, ASICs, programmable logic devices, transistor-based circuits, or various combinations thereof. In other embodiments, the system 500 may include further units required for functionality of the system. In certain embodiments, some of the units 515, 525, 545, 555, 565, and 575 can be removed from the system 500 without impacting the functionality of the system 500. In further embodiments, the some of the units 515, 525, 545, 555, 565, and 575 can be merged into a single unit without impacting the functionality of the system 500.

The ANN quantization unit 535 can be configured to receive an ANN description 580 and a batch of sets $S_1, S_2, ..., S_N$ of input data 530 for the ANN computations. The input data may include real values. The ANN description 580 and the input data can be provided to ANN unit 520 by one or more client applications running on computer systems in communications with the ANN unit 520. The ANN description 580 and the input data can be received by the ANN unit 520 from an external system in communication with the ANN unit 520.

Upon receiving the ANN description and the first set $S_1$, the ANN quantization unit 535 may quantize, based on a quantization scheme, a real value-based ANN, that was trained using real values, to obtain an integer-based ANN. Alternatively, if $S_1$ does not include enough data to proceed with a proper quantization, the ANN quantization unit 535 may wait for extra batches of data $S_2, ..., S_N$, before proceeding with the quantization of the ANN. The quantization of the ANN may include quantization of weights of neurons of the ANN. The quantization can be performed based on a quantization scheme. The quantization scheme may include ranges of real values to be quantized, quantization intervals assigned to the ranges, and quantization levels (integer values) assigned to the quantization intervals. The quantization scheme can be individual for each layer of the ANN. The integer-based ANN can be further provided to the ANN computation unit 565.

The input data storage 525 can be configured to store one or multiple sets of input data $S_1, S_2, ..., S_N, ...$ and other information concerning the quantization performed for the data. In some embodiments, where the input data are not kept for adjustment of the quantization scheme, the data storage 525 can be removed from the ANN unit 520. In other embodiments, the input data storage 525 can be used to store, in addition to sets of input data and information concerning the quantization, one or more of the following: temporary results of quantization, information concerning the ANN description modified by the quantization process, measure of quality or any information that is relevant to performing a hidden quantization of an ANN.

The input data quantization unit 515 can receive the batch of sets $S_1, S_2, ..., S_N$ of input data 530. The input data quantization unit 515 can quantize, based on the quantization scheme, sets of $S_1, S_2, ..., S_N$ to obtain quantized input data. The quantized input data can be further provided to the ANN computation unit 565.

The ANN computation unit 565 can be configured to perform integer-based ANN computations using the quantized ANN and quantized input data to obtain results $R_1, R_2, ..., R_N$. The saturations counter unit 575 can be configured to count a number of saturations in neurons of the integer-based ANN and provide the number of saturations to the quality estimation unit 555. A neuron can be saturated if output values of the neuron are close to an asymptotic end of the transfer function F(X). In integer-based ANN computations, the neuron can be saturated if output of the neuron is close to a boundary of the integer values (for example, −128 or 127 if 8-bit integers are used).

The quality estimation unit 555 can estimate a measure of quality of the integer-based ANN computations. The measure of quality can depend on the number of saturations in neurons. The measure of quality may also depend on other parameters including parameters associated with the description of the ANN, such as an order of the layers, a number of operations performed during ANN computations, a number of neurons, and other parameters associated to the computation of the results of ANN. A higher measure of quality may correspond to a lower number of saturations in neurons either globally or locally. The quality estimation unit 555 may compare the measure of quality to a pre-determined threshold of quality. If the measure of quality exceeds the pre-determined threshold, then the same quantization scheme can be used to quantize the next set of input data.

If the level of quality is lower than a pre-determined threshold, the quantization adjustment unit 545 may adjust the quantization scheme. Adjustment of the quantization scheme may include adjustment of one or more ranges to be quantized, quantization intervals, quantization levels for the ranges and other parameters used in quantization. The ANN quantization unit 535 may quantize, based on the adjusted quantization scheme, the ANN trained using the real values to obtain an updated integer-based ANN and provide the updated integer-based ANN to the ANN computation unit 565.

After the quality estimation unit 555 determines that the measure of the quality has reach an acceptable level of quality, then the ANN quantization unit 535 and the input data storage 525, can be disabled and further input data sets $S_{N+X}$ can be processed. The saturation counter unit 575 may continue monitoring the computation results from the ANN computation unit 565. The quantization estimation unit 555 may trigger, based on the measure of quality, further adjustment of the quantization scheme by the quantization adjustment unit 545 and further ANN quantization by the ANN quantization unit 535. The further ANN quantization can be based on further input data sets $S_{N+X}$ and, optionally, on some of previous input data $S_1$, $S_2$, . . . , $S_N$ stored in the input data storage unit 525. The quality measurement unit 555 may also trigger, based on the measure of quality, an issue of a message including a warning, an error information, or information in any other form of communication, to a user of the ANN unit 520 or an external system associated with the user. In response to the issue of the message, the external system or user can decide to issue an external event on the ANN unit 520. The external event can include a further quantization adjustment, new quantization of new input data 530, further measurement of the quality of the results of the ANN computations including a new count of neuron saturation, or disabling of the ANN unit 520 completely to ensure the safety of an external system or the user.

Figure 6:
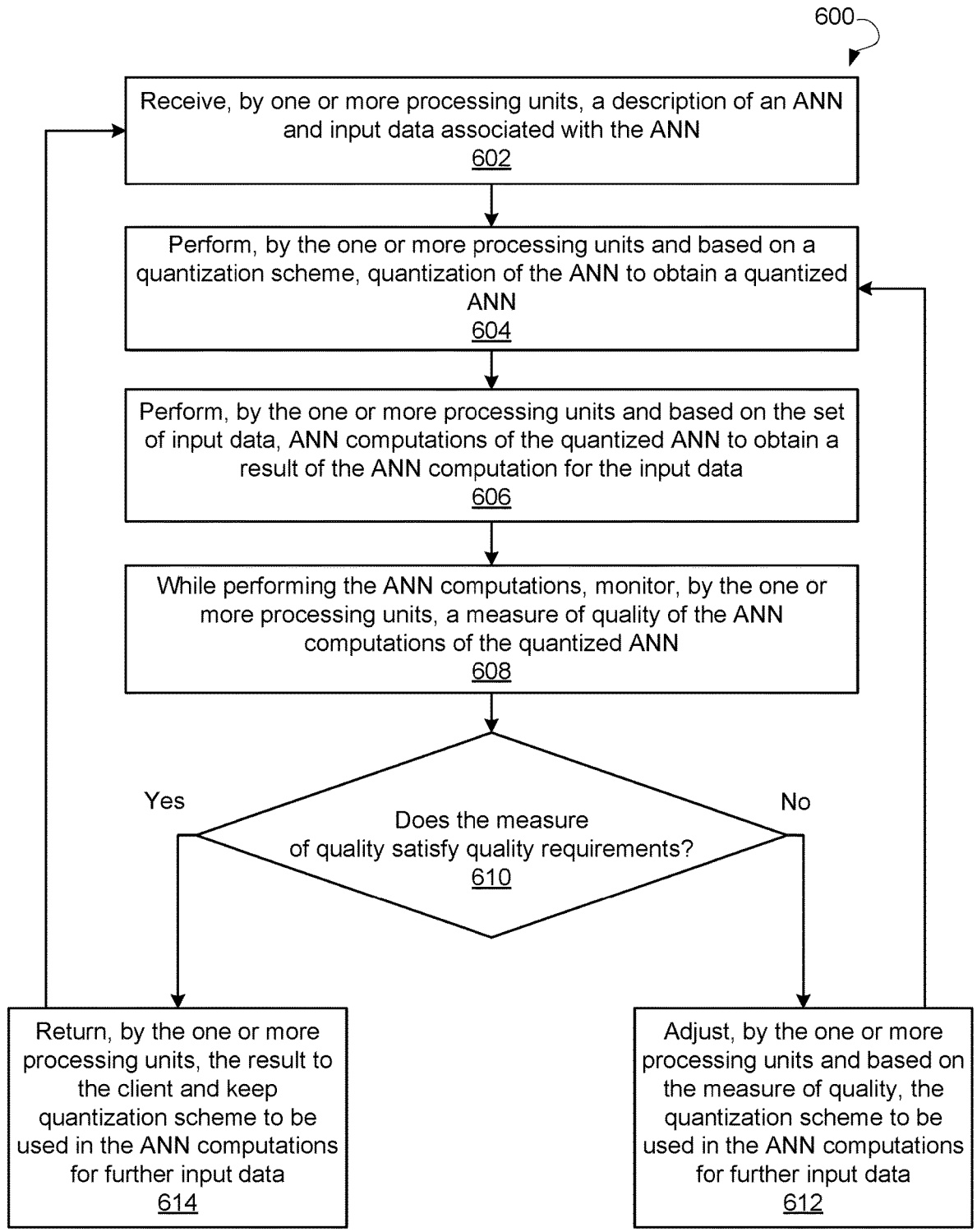
FIG. 6 is a flow chart showing steps of a method for quality monitoring and hidden quantization in ANN computations, according to some example embodiments.

FIG. 6 is a flow chart illustrating a method 600 for managing quantization in ANN computations, in accordance with some example embodiments. In some embodiments, the operations may be combined, performed in parallel, or performed in a different order. The method 600 may also include additional or fewer operations than those illustrated. The method 600 may be performed by the system 100 of FIG. 1 or the system 500 described above with reference to FIG. 5.

In block 602, the method 600 may commence with receiving, by one or more processing units from an external system, a description of an ANN and input data associated with the ANN.

In block 604, the method 600 may perform, by the one or more processing units and based on a quantization scheme, quantization of the ANN to obtain a quantized ANN. The quantization of the ANN may include mapping data from a first interval of a first data type into data from a second interval of a second data type.

In block 606, the method 600 may perform, by the one or more processing units and based on the set of input data, ANN computations of the quantized ANN to obtain a result of the ANN computation for the input data;

In block 608, the method 600 may, while performing the ANN computations, monitor, by the one or more processing units, a measure of quality of the ANN computations of the quantized ANN. The monitoring of the measure of quality may include counting number of neuron saturations. A neuron of the ANN can be saturated when a result of computation of the neuron is substantially close to one of boundaries of the second interval of the second data type. The ANN computations of the quantized ANN can be performed on an integrated circuit, such as an ASIC or FPGA, configured to perform calculations using values of the second type data. The integrated circuit can be configured to collect information concerning quality of the ANN computations.

In the decision block 610, the method 600 may determine whether the measure of quality satisfy quality requirements.

If the measure of quality does not satisfy the quality requirements, then, in block 610, the method 600 may adjust, by the one or more processing units and based on the measure of quality, the quantization scheme to be used in the ANN computations for further input data. The adjustment of the quantization scheme may include modifying at least one boundary of the first interval. The adjustment of the quantization scheme results in improving the measure of quality. The method 600 may further proceed to block 604 to perform quantization of the ANN using the adjusted quantization scheme.

If the measure of quality satisfies the quality requirements, then, in block 612, the method 600 may return, by the one or more processing units, the result to the external system and keep the quantization scheme to be used in the ANN computations for further input data. The method 600 mat may then proceed to block 604 to receive further input data for ANN.

Figure 7:
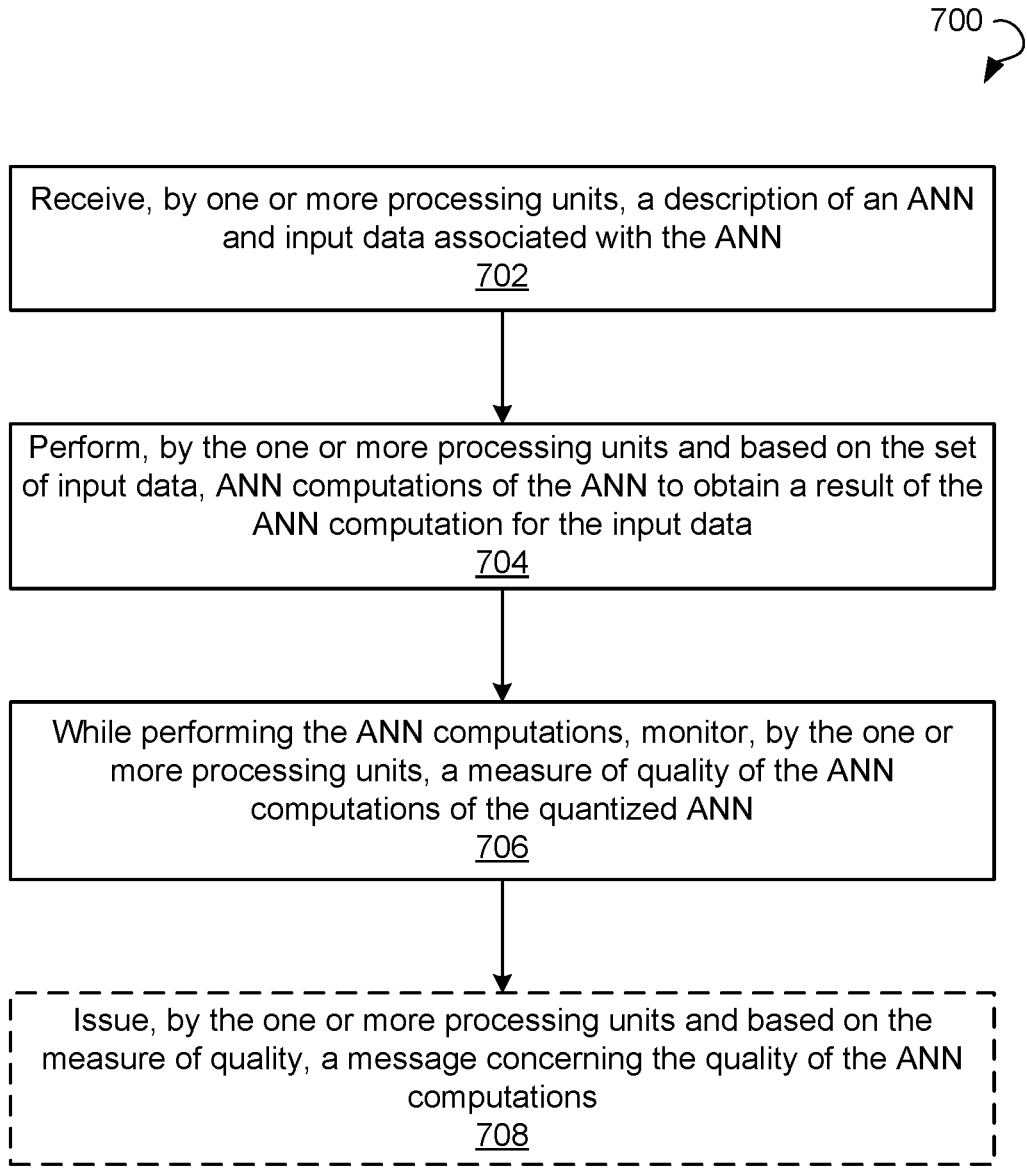
FIG. 7 is a flow chart showing steps of a method for monitoring a quality of a result of computations of an ANN, according to some example embodiments.

FIG. 7 is a flow chart showing steps of a method 700 for monitoring a quality of a result of computations of an ANN, according to some example embodiments. The method 700 can be performed by the system 100 of FIG. 1 or the system 500 of FIG. 5.

The method 700 may commence in block 702 with receiving, by one or more processing units, from an external system, a description of an ANN and input data associated with the ANN. In block 704, the method may perform, by the processing units and based on the of input data, ANN computations to obtain result of the ANN computation for the input data. In block 704, while performing the ANN computations, the method 700 may monitor, by the processing units, a measure of quality of the ANN computations. In optional block 708, the method 700 may issue, by the processing units and based on the measure of the quality, a message concerning quality of the ANN computations. The message can be sent to the external system.

Figure 8:
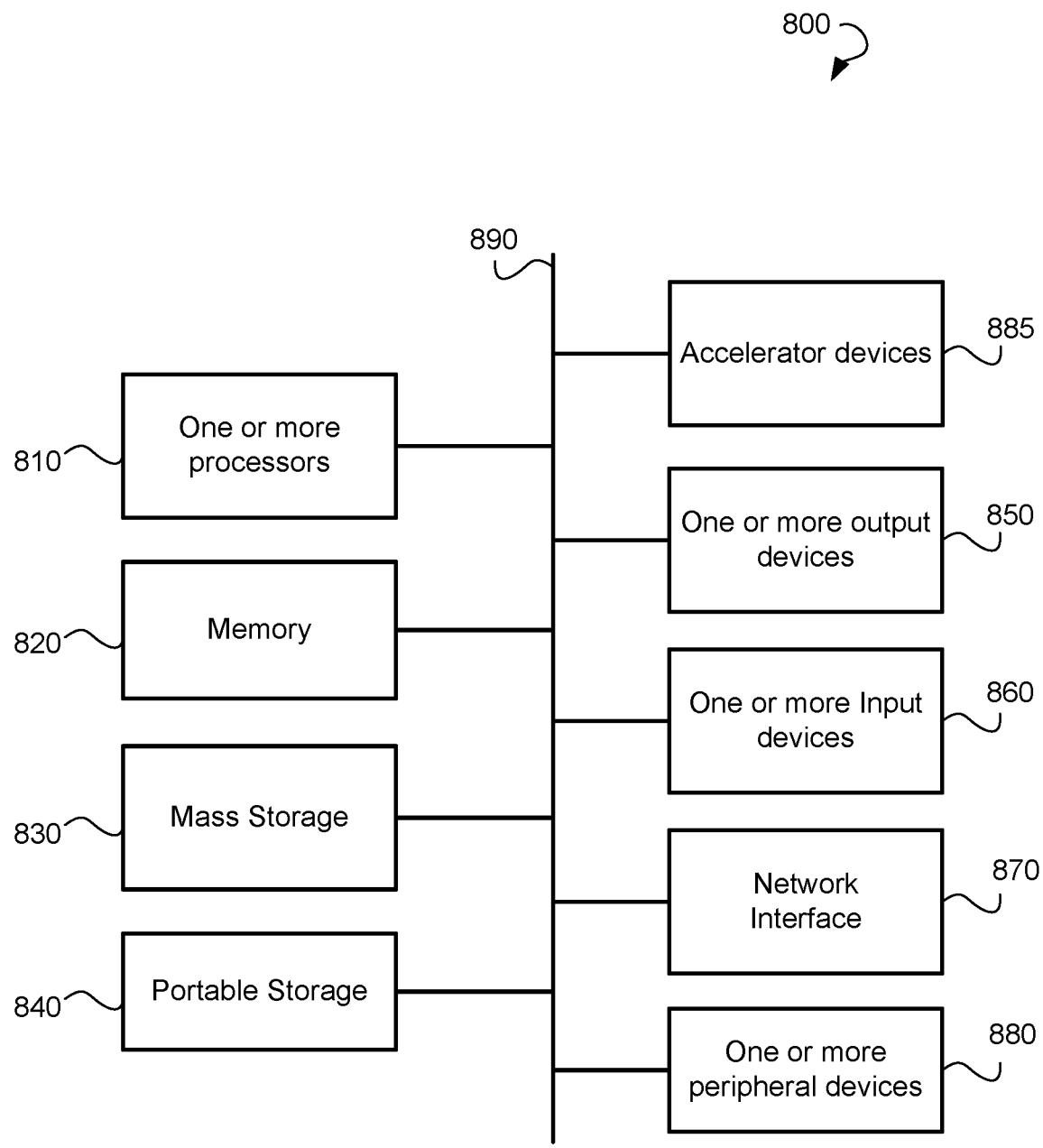
FIG. 8 shows a computing system that can be used to implement embodiments of the disclosed technology.

FIG. 8 illustrates an example computing system 800 that may be used to implement embodiments described herein. The example computing system 800 of FIG. 8 may include one or more processors 810 and memory 820. Memory 820 may store, in part, instructions and data for execution by the one or more processors 810. Memory 820 can store the executable code when the exemplary computing system 800 is in operation. The processor 810 may include internal accelerators like a graphical processing unit, a FPGA, or similar accelerators that may be suitable for use with embodiments described herein. The memory 820 may include internal accelerators like a graphical processing unit, a FPGA, or similar accelerators that may be suitable for use with embodiments described herein. The example computing system 800 of FIG. 8 may further include a mass storage 830, portable storage 840, one or more output devices 850, one or more input devices 860, a network interface 870, and one or more peripheral devices 880.

The components shown in FIG. 8 are depicted as being connected via a single bus 890. The components may be connected through one or more data transport means. The one or more processors 810 and memory 820 may be connected via a local microprocessor bus, and the mass storage 830, one or more peripheral devices 880, portable storage 840, and network interface 870 may be connected via one or more input/output buses.

Mass storage 830, which may be implemented with a magnetic disk drive, an optical disk drive or a solid state drive, is a non-volatile storage device for storing data and instructions for use by a magnetic disk, an optical disk drive or SSD, which in turn may be used by one or more processors 810. Mass storage 830 can store the system software for implementing embodiments described herein for purposes of loading that software into memory 820. The mass storage 830 may also include internal accelerators like a graphical processing unit, a FPGA, or similar accelerators that may be suitable for use with embodiments described herein.

Portable storage 840 may operate in conjunction with a portable non-volatile storage medium, such as a compact disk (CD) or digital video disc (DVD), to input and output data and code to and from the computing system 800 of FIG. 8. The system software for implementing embodiments described herein may be stored on such a portable medium and input to the computing system 800 via the portable storage 840.

One or more input devices 860 provide a portion of a user interface. The one or more input devices 860 may include an alphanumeric keypad, such as a keyboard, for inputting alphanumeric and other information, or a pointing device, such as a mouse, a trackball, a stylus, or cursor direction keys. Additionally, the computing system 800 as shown in FIG. 8 includes one or more output devices 850. Suitable one or more output devices 850 include speakers, printers, network interfaces, and monitors.

Network interface 870 can be utilized to communicate with external devices, external computing devices, servers, and networked systems via one or more communications networks such as one or more wired, wireless, or optical networks including, for example, the Internet, intranet, LAN, WAN, cellular phone networks (e.g., Global System for Mobile communications network, packet switching communications network, circuit switching communications network), Bluetooth radio, and an IEEE 802.11-based radio frequency network, among others. Network interface 870 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a USB.

One or more peripheral devices 880 may include any type of computer support device to add additional functionality to the computing system. The one or more peripheral devices 880 may include a modem or a router.

The example computing system 800 of FIG. 8 may also include one or more accelerator devices 885. The accelerator devices 885 may include PCIe-form-factor boards or storage-form-factor boards, or any electronic board equipped with a specific electronic component like a GPU, a Neural Processing Unit, a Multi-CPU component, a FPGA component, or similar electronic or photonic components, that may be suitable for use with embodiments described herein.

The components contained in the exemplary computing system 800 of FIG. 8 are those typically found in computing systems that may be suitable for use with embodiments described herein and are intended to represent a broad category of such computer components that are well known in the art. Thus, the exemplary computing system 800 of FIG. 8 can be a personal computer, hand held computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as RAM. Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, SSD, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. The instructions or data may not be used by the CPU but be accessed in writing or reading from the other devices without having the CPU directing them.

Thus, systems and methods for quality monitoring and hidden quantization ANN computations have been described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A system for monitoring a quality of computations of an artificial neural network (ANN), the system comprising one or more processing units configured to:
receive a description of the ANN and input data associated with the ANN;
perform, for the input data, ANN computations of the ANN to obtain neuron outputs of neurons of the ANN; and
while performing the ANN computations;
monitor a measure of quality of the ANN computations, wherein the measure of quality is determined based solely on the following: internal parameters of the description of the ANN and counting a number of the obtained neuron outputs satisfying a predetermined criterion;
in response to the monitoring the measure of quality of the ANN computations, determine that the measure of quality does not satisfy quality requirements; and
in response to the determination, adjust, based on the measure of quality, a quantization scheme to be used in the ANN computations for further input data.

2. The system of claim 1, wherein the one or more processing units are configured to receive a user input, the user input including a quality requirement related to the measure of quality of the ANN computations.

3. The system of claim 1, wherein the performing the ANN computations includes:
performing, based on the quantization scheme, quantization of the ANN to obtain a quantized ANN; and
performing, using the quantized ANN and based on the input data, the ANN computations to obtain the neuron outputs of the neurons of the ANN.

4. The system of claim 1, wherein:
the quantization of the ANN includes mapping data from a first interval of a first data type into data from a second interval of a second data type; and
adjusting the quantization scheme includes modifying a boundary of at least one of the first interval or the second interval.

5. The system of claim 1, wherein the adjusting the quantization scheme results in improving the measure of quality.

6. The system of claim 1, wherein the one or more processing units are configured to:
determine that the measure of quality satisfies the quality requirements;
in response to the determination:
return a result of the ANN computations of the quantized ANN for the input data; and
keep the quantization scheme to be used for the further input data.

7. The system of claim 1, wherein the one or more processing units are configured to repeat:
performing, based on the adjusted quantization scheme, the quantization of the ANN to obtain a further quantized ANN;
performing ANN computations of the further quantized ANN for the input data;
monitoring a further measure of quality of the ANN computations of the further quantized ANN;
determining that the further measure of quality does not satisfy the quality requirements; and
in response to the determination that the further measure of quality does not satisfy the quality requirements, adjusting the further quantization scheme to be used for the further input data.

8. The system of claim 7, wherein the one or more processing units are configured to:
determine that the further measure of quality satisfies the quality requirements; and
in response to the determination that the further measure of quality satisfies the quality requirements, keep the further quantization scheme to be used for the ANN computations for the further input data.

9. The system of claim 7, wherein the one or more processing units are configured to:
determine that the further measure of quality satisfies the quality requirements; and
in response to the determination that the further measure of quality satisfies the quality requirements, return a result of the ANN computation of the further quantized ANN for the input data.

10. The system of claim 3, wherein the one or more processing units are configured to:
receive further input data;
perform ANN computations of the quantized ANN for the further input data while keeping the quantized ANN unchanged;
determine, based on the ANN computations for the further input data, a further measure of quality; and
based on the further measure of quality, adjust the quantization scheme and perform quantization of the ANN based on the adjusted quantization scheme.

11. The system of claim 7, further including a storage unit configured to store the input data and an information concerning the quantization of the ANN, and wherein the one or more processing units are configured to perform the ANN computations of the further quantized ANN using the stored input data.

12. The system of claim 1, wherein the one or more processing units are configured to:
receive the description of the ANN and the input data associated with the ANN from an external system, the external system being in communications with the one or more processing units; and
based on the measure of quality, issue a message concerning the quality of the ANN computations to the external system or a user associated with the external system.

13. The system of claim 12, wherein the external system is configured to, in response to receiving the message, send an instruction to the one or more processing units, the instruction causing the one or more processing units to perform an operation concerning the quality of the ANN computations.

14. The system of claim 1, wherein the ANN computations of the ANN are performed on an integrated circuit, wherein the integrated circuit is configured to collect information concerning quality of the ANN computations.

15. A method for monitoring a quality of computations of an artificial neural network (ANN), the method comprising:
receiving, by one or more processing units from an external system, a description of an ANN and input data associated with the ANN;
performing, by the one or more processing units and based on the input data, ANN computations to obtain neuron outputs of neurons of the ANN; and
while performing the ANN computations:
monitoring, by the one or more processing units, a measure of quality of the ANN computations, wherein the measure of quality is determined based solely on the following: internal parameters of the description of the ANN and counting a number of the obtained neuron outputs satisfying a predetermined criterion;
in response to the monitoring the measure of quality of the ANN computations, determining that the measure of quality does not satisfy quality requirements; and
in response to the determination, adjusting, based on the measure of quality, a quantization scheme to be used in the ANN computations for further input data.

16. The method of claim 15, wherein the performing the ANN computations includes:
performing, based on the quantization scheme, quantization of the ANN to obtain a quantized ANN; and
performing, based on the input data, ANN computations of the quantized ANN to obtain a result of the ANN computation for the input data.

17. The method of claim 16, wherein:
the quantization of the ANN includes mapping data from a first interval of a first data type into data from a second interval of a second data type; and
adjusting the quantization scheme includes modifying at least one boundary of one of the first interval and the second interval.

18. The method of claim 17, wherein a neuron output of a neuron of the ANN is saturated when the neuron output is within a predetermined number of integers from the at least one boundary of the second interval of the second data type.

19. The method of claim 15, wherein the adjusting the quantization scheme results in improving of the measure of quality.

20. The method of claim 16, further comprising:
determining, by the one or more processing units, that the measure of quality satisfies the quality requirements; and
in response to the determination:
returning, by the one or more processing units to the external system, the result of the ANN computations of the quantized ANN for the input data; and
keeping, by the one or more processing units, the quantization scheme to be used for the further input data.

21. The method of claim 15, further comprising, prior to the determining that the measure of quality does not satisfy the quality requirements, receiving, by the one or more processing units, a user input, the user input including the quality requirements.

22. The method of claim 16, wherein the ANN computations of the quantized ANN are performed on an integrated circuit, wherein the integrated circuit is configured to collect information concerning quality of the ANN computations.

23. A system for quality monitoring and hidden quantization of artificial neural networks (ANN), the system comprising:
one or more processing units; and
a memory communicatively coupled with the one or more processing units, the memory storing instructions which when executed by the one or more processing units perform a method comprising:
receiving, from an external system, a description of an ANN and input data associated with the ANN;
performing, based on a quantization scheme, quantization of the ANN to obtain a quantized ANN, wherein the quantization of the ANN includes mapping data from a first interval of a first data type into data from a second interval of a second data type;
performing, based on the input data, ANN computations of the quantized ANN to obtain neuron outputs of neurons of the ANN;
while performing the ANN computations:
determining and monitoring a measure of quality of the ANN computations of the quantized ANN, wherein the measure of quality is determined based solely on the following: internal parameters of the description of the ANN and counting a number of the obtained neuron outputs satisfying a predetermined criterion;
in response to the monitoring the measure of quality of the ANN computations, determining that the measure of quality does not satisfy quality requirements; and
in response to the determination, adjusting, by the one or more processing units and based on the measure of quality, the quantization scheme to be used in the ANN computations for further input data, wherein the adjusting the quantization scheme includes modifying at least one boundary of one of the first interval and the second interval.

* * * * *